Sept. 22, 1936.  W. BOWKER  2,054,848
COLORING THERMOPLASTIC MATERIAL
Filed March 12, 1932  2 Sheets-Sheet 2
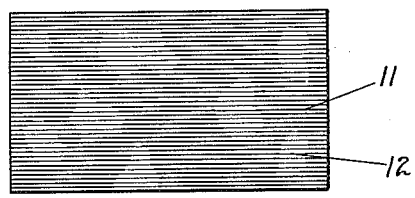
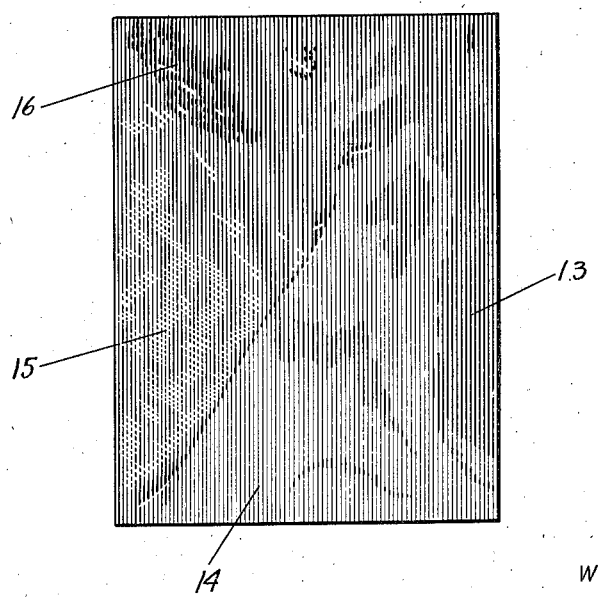
INVENTOR
WILL A BOWKER
BY
A TORNEYS Patented Sept. 22, 1936

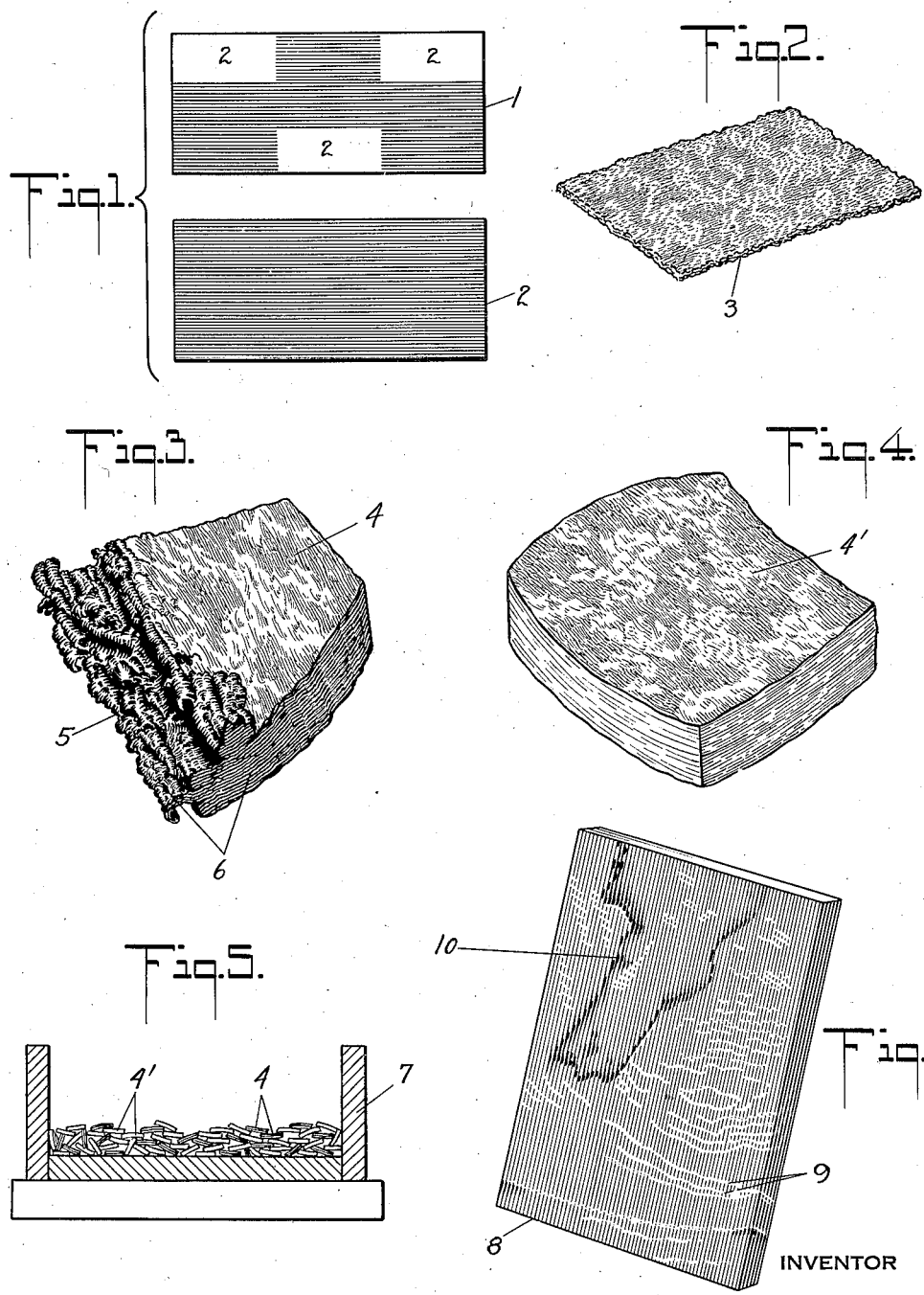

2,054,848

UNITED STATES PATENT OFFICE 2,054,848

COLORING THERMOPLASTIC MATERIAL

William Bowker, Newark, N. J., assignor to Celluloid Corporation, a corporation of New Jersey Application March 12, 1932, Serial No. 598,479

18 Claims. (Cl. 18—51)

This invention relates to the production of differential color effects of great beauty in thermoplastic material, and relates more particularly to the preparation of materials made of derivative of cellulose plastics having fracture lines resembling those of natural onyx, particularly Brazilian onyx.

An object of my invention is to prepare articles made of thermoplastic compositions and presenting differential color effects that have a pleasing appearance. A further object of this invention is to prepare articles of derivative of cellulose plastics presenting mottled and fracture line effects simulating those of onyx. Further objects of this invention will appear from the following detailed description.

While attempts have previously been made to produce onyx effects in derivative of cellulose plastics, the effects previously obtained have been made of rather regular mottled and straight line configuration, nowhere approaching the irregular and delicate effects of Brazilian onyx. While many attempts have been made to simulate these effects, no success has been had prior to my invention. After a prolonged series of trials, I have found that if a certain procedure in the application of colors and a manipulation of the thermoplastic composition are observed, beautiful appearance of delicate mottled or marbleized effect of one color and fracture lines of another color, the whole presenting natural or flowed demarcations, may be produced in thermoplastic compositions, which differential color effects may be caused to simulate onyx, particularly Brazilian onyx, to an extremely close degree.

In producing the differential effects of this invention, a thermoplastic composition, particularly one containing a derivative of cellulose, such as cellulose nitrate or an organic derivative of cellulose such as cellulose acetate, cellulose formate, cellulose propionate, cellulose butyrate, or ethers of cellulose such as methyl cellulose, ethyl cellulose and benzyl cellulose, and a suitable plasticizer such as camphor, diethyl tartrate, dimethyl tartrate, dibutyl tartrate, diethyl phthalate, dimethyl phthalate, triacetin, etc., is prepared in any known or suitable manner, such as by kneading the same at elevated temperatures with a solvent, driving off most of the solvent, filtering and then working the mass by passing the same repeatedly through heated rolls to form slabs. While no color need be incorporated in the mass at this stage, I prefer to impart some color, say green, rose, maize, etc., by the addition of suitable dyes or lakes. However the amount and nature of any color that is incorporated should preferably be such that the material is not opaque, but is transparent or translucent. Plastic compositions other than derivative of cellulose plastics may be employed in this invention, examples of which are casein, rubber, and condensation products of phenol and formaldehyde or of urea and formaldehyde.

In order to obtain the delicate mottled or marbleized effect in the material, a slab of the thermoplastic material has applied thereto locally in selected areas, a paint or coating composition, preferably of light color (say white), containing a relatively opaque pigment such as zinc oxide or titanium oxide, which pigment is preferably, but not necessarily, suspended in a solvent or swelling agent for the derivative of cellulose of the thermoplastic composition. If desired this paint or coating composition may also contain some plasticizer for the derivative of cellulose. An uncoated slab of the plastic composition is superposed on the coated surface of the coated slab, and the two slabs are passed between heated malaxating rolls, and the slab or sheet so formed is doubled over itself and worked between heated smooth or corrugated rolls. The slab or sheet so formed is doubled and worked between the rolls again, and this operation is repeated until the pigment is disseminated to the desired degree of distribution or mottling of the pigment, and produces the desired delicate mottled or marbleized effect, presenting the appearance of flaky particles obliquely and edgewised interspersed in local areas of the base color.

In order to produce the novel irregular fracture and flowed line or vein effect, the slab so formed is cut, broken or otherwise severed into pieces or "scallops" and the cut edges of some of these scallops are coated with a paint or coating composition containing a dye, lake or pigment of a contrasting color, say brown, black or red, which coating composition preferably contains a plasticizer and a volatile solvent or swelling agent for the derivative of cellulose. These edge-coated pieces or scallops are mixed at random with uncoated pieces or scallops, and are caused to weld or amalgamate by the application of heat or pressure by any suitable means, such as by presses, or by passing the same between heated rolls. From the block or slab so formed sheets, rods, blocks, tubes or any other desired articles may be formed, which may then be seasoned, polished, buffed, cut and/or subjected to any known or suitable process to form the desired article.

By this process there may be produced articles having a translucent or transparent appearance of one color (say green, rose or maize) comprising the base in which there is a delicate mottled or marbleized effect of another color (say white) produced by obliquely and edgewise dispersed flaky colors interspersed in limited areas of the base color and having also therein fracture and flowed line or vein effects that are irregularly disposed, the whole presenting the luxurious appearance of Brazilian onyx or other fine onyx.

In order further to illustrate my invention, but without being limited thereto, the following specific modes of carrying out the same will be described in connection with the accompanying drawings, wherein Fig. 1 shows two slabs, one being locally coated with a paint, the other being uncoated, Fig. 2 shows a slab formed by working the slab shown in Fig. 1, Fig. 3 shows a piece of scallop cut from the slab shown in Fig. 2 and having its edges painted, Fig. 4 shows a piece of scallop cut from the slab shown in Fig. 2, but having unpainted edges, Fig. 5 is a diagrammatic showing of a press, in which the pieces shown in Figs. 3 and 4 are placed at random, Fig. 6 is an attempted showing of the appearance of a sheet or block of thermoplastic material prepared in accordance with my invention, Fig. 7 shows a slab having milky, flocculent blotches or mottle effects to be used as a starting material for making a modified effect, and Fig. 8 shows the appearance of a sheet or block made by my invention when employing the slab shown in Fig. 7 as the starting material.

A plastic composition containing cellulose nitrate or cellulose acetate and suitable plasticizer and having a translucent green color is prepared in any suitable manner, say by kneading the cellulose derivative and plasticizer with a volatile solvent at elevated temperatures in a kneader, driving off some of the volatile solvent, filtering, and working the same on heated malaxating rolls while incorporating a green color. Slabs having a thickness of say ¼" are rolled therefrom by means of the heated malaxating rolls.

A slab I of this material of a length of say 60" and a width of approximately 30" is taken, and upon one surface of this slab, there is applied a white coating composition containing zinc oxide or titanium oxide dispersed in a vehicle which may contain a plasticizer for the cellulose acetate or cellulose nitrate and a more or less volatile solvent or swelling agent for the same. This white paint is applied in local selected areas indicated at 2 in Fig. 1.

Upon the painted surface of the slab I there is placed the unpainted slab 2, and the assembly is passed once between heated smooth malaxating rolls. The slab so formed is folded once upon itself and the doubled layer is again passed between the heated malaxating rolls, and the slab so formed is again folded and passed between the rolls. This operation of folding and passing between the rolls is repeated six times in order to obtain the proper distribution or mottling of the white pigment, the slab finally formed being indicated at 3 on Fig. 2, the fine lines on this figure being an attempt to show the white mottle effect. This slab is caused to have a thickness of about ¾" in the final rolling.

The slab 3 is then cut, chopped or otherwise severed into pieces or scallops 4, 4', having dimensions of approximately 3" x 4". Some of the scallops 4, and preferably those cut from the edges of the slab 3, and having a rough edge 5, as shown in Fig. 3, have the edges painted first with a white paint and then with a brown dye or lake as shown at 6 in Fig. 3. The white paint used for this purpose may be similar to that employed for painting the areas 2 on the slabs shown in Fig. 1 and the brown stain contains a dye or dyes dissolved in a volatile solvent or swelling agent for the cellulose acetate or cellulose nitrate and preferably contains a plasticizer for the same.

As shown in Fig. 4, some of the scallops or pieces 4' do not have their edges painted or stained. The scallops 4 with painted and stained edges and the scallops 4' with unpainted edges are mixed at random, say in the proportion of one edge-painted scallop 4 to two unpainted scallops 4', and these are welded or joined together. Fig. 5 shows these pieces placed in a press 7, and by the application of heat and pressure, the pieces or scallops are joined into a slab or block.

From the slab or block so formed, by operations of cutting, seasoning, polishing, etc., articles may be formed in any suitable manner. Fig. 6 shows a thick sheet made of such block. In this Fig. 6, the block is shown as having a transparent or translucent color, say light olive green, in the body or base thereof and indicated by the fine parallel lines, delicate mottled or marbelized effects of slightly off-white color with a green tinge, having the appearance of obliquely and edgewise dispersed flaky particles interspersed in limited areas of the base color indicated as 9, and the dark broken line or irregular vein effect 10 having a dark color (say rust brown), simulating Brazilian onyx.

As a modification of the above process, the slabs I painted as shown in Fig. 1 and having a thickness of 5/16" has superposed on the painted side of an unpainted slab of the same thickness, and the assembly is passed once between heated smooth rolls. The slab so formed is doubled over and passed once between heated corrugated rolls, and then doubled and passed once between smooth heated rolls, the rolls being 3/8" apart. One-half of the slab so formed has applied thereto a white paint not containing as much pigment as the paint first applied, this paint being applied in the form of a center longitudinal band having a width of about one-third of the width of the slab. The other half of the slab, which is unpainted, is placed on the painted side of the other half of the slab, and the assembly then passed once between heated corrugated rolls. The slab is then doubled over and passed between smooth heated rolls, and doubled over and then again passed between smooth rolls to form slabs that are ¾" thick. The slab so formed is then cut into scallops having dimensions of about 2 x 2.5", and the edges of some of these scallops are painted while the others are not, in a manner similar to that described above, and these scallops are welded together by heat and pressure to form blocks or slabs, which may be subjected to any further process such as cutting, seasoning, polishing, etc. The effect so produced is similar to that shown in Fig. 6, except that the white mottled effect is more plentiful and more broken up.

A further modification of my invention will be described in connection with Figs. 7 and 8. As a starting material, instead of the uniformly colored slabs shown in Fig. 1, I start with slabs indicated in Fig. 7, having a translucent base color (say green) indicated at 11 in which there are disposed irregular blotches 12 of a color (say white) less translucent than the base color and of a milky, flocculent or opalescent nature. This effect may be produced by any known or suitable process, such as by mottling a pigment in the material while being worked on the malaxating rolls.

The slabs shown in Fig. 7 are then worked up in a similar manner as described in connection with Figs. 1 to 6, namely the surface of one slab is painted in local areas with say a white paint, an unpainted slab shown in Fig. 7 is superposed thereon and the assembly passed between rolls with doubling a plurality of times. The slabs are cut into scallops, some of the edges of some scallops are painted or stained brown, the scallops then pressed into a block, from which desired articles may be cut.

As shown in Fig. 8, there is produced the effect of a highly translucent color (say light olive green) indicated at 13, in which are disposed irregular blotches of a color (say off-white tinged with green) less translucent than the base color and of a milky, flocculent or opalescent nature, indicated at 14. Also obliquely and edgewised interspersed in limited areas of the base color are flaky particles of a color 15 (which may be white) of the approximately translucency of color 14. Throughout the configuration of the above three colors are irregular fracture lines or veins 16 of a fourth color (say rust brown). The effect is a perfect simulation of Brazilian onyx.

It is to be understood that the foregoing detailed description is given merely by way of illustration and that many variations may be made therein without departing from the spirit of my invention.

Having described my invention, what I desire to secure by Letters Patent is:

1. Method of producing differential color effects in thermoplastic compositions comprising causing random disposed sheets of thermoplastic compositions having a color applied to at least some of the edges only thereof to weld together under heat and pressure.

2. Method of producing differential color effects in thermoplastic compositions comprising a derivative of cellulose comprising causing random disposed sheets of thermoplastic compositions containing a derivative of cellulose having a color applied to at least some of the edges only thereof to weld together under heat and pressure.

3. Method of producing fracture line effects comprising applying color to at least some edges only of relatively flat pieces of thermoplastic compositions, mixing such pieces at random with other pieces of thermoplastic composition whose edges have not been painted and applying heat and pressure to the same to cause them to unite.

4. Method of producing fracture line effects comprising a derivative of cellulose comprising applying color to at least some edges only of relatively flat pieces of thermoplastic compositions containing a derivative of cellulose, mixing such pieces at random with other pieces of thermoplastic composition containing a derivative of cellulose whose edges have not been painted and applying heat and pressure to the same to cause them to unite.

5. Method of producing fracture line effects comprising severing a slab of a derivative of cellulose plastic into pieces, applying a coating composition comprising a dark colored material and a solvent or swelling agent for the derivative of cellulose to the edges only of some of the pieces, mixing such edge-colored pieces with other pieces of the derivative of cellulose plastic to whose edges no color has been applied and applying heat and pressure to cause the same to unite.

6. Method of producing onyx effects in thermoplastic compositions comprising applying heat and pressure to random disposed pieces of thermoplastic composition having relatively opaque pigment in fine mottled effect disseminated therein, some of the edges only of some of the pieces having a contrasting color applied thereto.

7. Method of producing onyx effects in thermoplastic compositions comprising a derivative of cellulose comprising applying heat and pressure to random disposed pieces of a thermoplastic composition containing a derivative of cellulose having relatively opaque pigment in fine mottled effect disseminated therein, some of the edges only of some of the pieces having a contrasting color applied thereto.

8. Method of producing onyx effects in thermoplastic compositions comprising a derivative of cellulose, comprising severing into pieces a slab of a derivative of cellulose plastic having a relatively opaque pigment in fine mottled effect disseminated therein, applying a coating composition comprising coloring matter of dark color to the edges only of some of the pieces, mixing such edge-colored pieces with other pieces of the derivative of cellulose plastic to whose edges no color has been applied and applying heat and pressure to cause the same to unite.

9. Method of producing onyx effects in thermoplastic compositions comprising a derivative of cellulose comprising coating part of the surface of a slab of the derivative of cellulose with a relatively opaque pigment, superposing another slab on the coated surface, causing them to join by passing between heated rolls, folding the slab so formed over itself and rolling, repeating the folding and rolling until the desired dissemination of the pigment is obtained, severing the slab so formed into pieces, applying a coating composition comprising coloring matter of dark color to the edges only of some of the pieces, mixing such edge-colored pieces with other pieces of the derivative of cellulose plastic whose edges have not been coated and applying heat and pressure to cause the same to unite.

10. A thermoplastic composition having a base of one color having flaky particles of another color interspersed in local areas therein.

11. A thermoplastic composition having a base of one color having flaky particles of another color interspersed in local areas therein and having therein irregular fracture lines or veins of a color different from the base.

12. A derivative of cellulose plastic composition presenting the appearance of onyx having a delicate fine mottle of flaky particles of one color and irregular broken flowed lines of a contrasting color.

13. A derivative of cellulose plastic composition presenting the appearance of onyx having a translucent body, a delicate fine mottle of flaky particles of one color and irregular broken flowed lines of a contrasting color.

14. A plastic composition presenting the appearance of onyx having a base of a translucent color, flaky particles of a less translucent color obliquely and edgewise dispersed in limited areas thereof, and irregular fracture lines or veins of another color.

15. A derivative of cellulose plastic composition presenting the appearance of onyx having a base of translucent color, irregular blotches of a less translucent color of a milky, flocculent or opalescent nature, obliquely and edgewise particles interpersed in limited areas of the base color, and irregular fracture lines or veins of another color.

16. Method of producing differential color effects in thermoplastic compositions comprising causing random disposed sheets of thermoplastic composition having an insoluble pigment applied to at least some of the edges thereof to weld together under heat and pressure.

17. Method of producing fracture line effects comprising applying an insoluble pigment to at least some edges of relatively flat pieces of thermoplastic compositions containing a derivative of cellulose, mixing such pieces at random with other pieces of thermoplastic composition containing a derivative of cellulose whose edges have not been coated with an insoluble pigment and applying heat and pressure to the same to cause them to unite.

18. A thermoplastic composition comprising a derivative of cellulose having differential color effects and having fracture flowed lines therein produced by the flow of an insoluble pigment on part of the material.

WILLIAM BOWKER.